United States Patent
Bennett et al.

(10) Patent No.: US 6,421,359 B1
(45) Date of Patent: Jul. 16, 2002

(54) APPARATUS AND METHOD FOR MULTI-SERVICE TRANSPORT MULTIPLEXING

(75) Inventors: Christopher J. Bennett, San Diego, CA (US); Maximilien d'Oreye de Lantremange, Kraainem (BE)

(73) Assignee: Tiernan Communications, Inc., San Diego, CA (US)

( * ) Notice: Subject to any disclaimer, the term of this patent is extended or adjusted under 35 U.S.C. 154(b) by 0 days.

(21) Appl. No.: 09/679,957

(22) Filed: Oct. 5, 2000

Related U.S. Application Data

(62) Division of application No. 08/944,902, filed on Oct. 6, 1997
(60) Provisional application No. 60/028,010, filed on Oct. 8, 1996, and provisional application No. 60/031,168, filed on Nov. 19, 1996.

(51) Int. Cl.[7] .................................................. H04J 3/02
(52) U.S. Cl. ...................................... 370/538; 370/443
(58) Field of Search .............................. 370/535, 401, 370/468, 431, 449, 451, 452, 437, 460, 537, 538, 539, 540, 541, 545, 443, 465, 235, 236, 229, 230

(56) References Cited

U.S. PATENT DOCUMENTS

| | | | |
|---|---|---|---|
| 4,958,344 A | | 9/1990 | Scott .......................... 370/112 |
| 5,123,015 A | * | 6/1992 | Brady, Jr. et al. |
| 5,159,447 A | * | 10/1992 | Haskell et al. |
| 5,319,707 A | | 6/1994 | Wasilewski et al. .......... 380/13 |
| 5,400,401 A | | 3/1995 | Wasilewski et al. ........... 380/9 |
| 5,420,866 A | | 5/1995 | Wasilewski et al. ..... 370/110.1 |
| 5,521,927 A | | 5/1996 | Kim et al. ................. 370/94.2 |
| 5,541,919 A | | 7/1996 | Yong et al. .................... 370/61 |
| 5,566,208 A | * | 10/1996 | Balakrishnan .............. 370/240 |
| 5,859,980 A | | 1/1999 | Kalkunte ............... 395/200.61 |
| 5,914,962 A | | 6/1999 | Fimoff et al. ............... 370/538 |

FOREIGN PATENT DOCUMENTS

WO   WO 95/23495   9/1995

OTHER PUBLICATIONS

Tiernan, J. C., and Wechselberger, T., "Description of a Universal Packet Multiplex Transport for the Transmission for Broadcast Applications of Digital Services, including Video, Audio, and Data Programs," Technical Proposal, International Organization for Standardization Organization Internationale de Normalization, pp. 1–14 (Jan. 9, 1993).

(List continued on next page.)

*Primary Examiner*—Huy D. Vu
*Assistant Examiner*—Duc C. Ho
(74) *Attorney, Agent, or Firm*—Hamilton Brook Smith & Reynolds, P.C.

(57) ABSTRACT

An elementary two-stream transport multiplexer provides for the addition of services contained in a transport stream to a pre-existing transport stream. The elementary multiplexer includes a pair of transport demultiplexers, a processor and a transport remultiplexer. The demultiplexers demultiplex a pair of input transport streams to their constituent service components and service control information tables. The service control information tables are routed to the processor which combines and reconfigures the information within the tables to provide a single set of output service control information tables. The demultiplexers filter the service components based on the output service control tables. The transport remultiplexer multiplexes the output tables with the filtered streams to provide an output transport stream.

6 Claims, 10 Drawing Sheets

OTHER PUBLICATIONS

"Implementation Guidelines for the Use of MPEG–2 Systems, Video and Audio in Satellite and Cable Broadcasting Applications in Europe, DVB–TS (Geneva)" pp. 1–14 (Jun., 1994).

"Guidelines on Implementation and Usage of Service Information," TM1324 Rev. 1, Final Draft, pp. 1–30 (Mar. 17, 1995).

"Digital Broadcasting Systems for Television, Sound and Data Services; Specification for Serive Information (SI) in Digital Video Broadcasting (DVB) Systems," European Telecommunication Standard, prETS 300 468, pp. 1–62 (Oct., 1994).

"Information Technology—Generic Coding of Moving Pictures and Associated Audio: Systems Recommendation H.222.0," ISO/IEC 13818–1, International Organization for Standardization Organization Internationale de Normalization, pp. 1–146 (Nov. 13, 1994).

"Transmultiplexing, Transcontrol and Transscrambling of MPEG–2/DVB Signal," O.W. Bungum, International Broadcasting Convention, Sep. 12–16, 1996 pp. 288–293.

"Der MPEG–2–Standard Generische Codierung Für Bewegtbilder und zugehöriger Audio–Information," Fernesh Und Kinotechnik, vol. 48(10), pp. 545–553 Oct. 1, 1994.

"Hardware Implementation of the Transport Stream Demultiplexer for the $^H DTV_T$ Demonstrator," Stammnitz et al; Signal Processing of HDTV, VI, 435–441 (1995).

"MPEG–2: A Tutorial Introduction to the Systems Layer," P. Sarginson, IEE 4/1–4/13, Jan. 1, 1995.

Liu, C. L. and Layland J. W., "Scheduling Algorithms for Multiprogramming in a Hard–Real–Time Environment," Journal of the Association for Computing Machinery, vol. 20, No. 1, pp 46–61, (Jan., 1973).

\* cited by examiner

APPARATUS AND METHOD FOR MULTI-SERVICE TRANSPORT MULTIPLEXING

RELATED APPLICATIONS

This application is a Divisional application of U.S. application Ser. No. 08/944,902 filed Oct. 6, 1997 which claims priority to U.S. Provisional Application Nos. 60/028,010, filed Oct. 8, 1996 and 60/031,168, filed Nov. 19, 1996 each of which is incorporated herein by reference in its entirety.

BACKGROUND OF THE INVENTION

The International Organization for Standardization (ISO) has adopted a standard (ISO/IEC 13818-1) that addresses the combining of one or more "elementary streams" of video and audio, as well as other data, into single or multiple streams suitable for storage or transmission. The ISO/IEC 13818-1 standard, hereinafter referred to as the "MPEG-2 Systems" standard, is described in detail in the ISO draft document "Generic Coding of Moving Pictures and Associated Audio", ISO/IEC JTC1/SC29/WG11 N0801 ( Nov. 13, 1994), which is incorporated herein in its entirety by reference.

The MPEG-2 Systems standard defines an individual coded video, audio or other coded bitstream as an "elementary stream". The contents of an elementary stream may be broken into a sequence of discrete units, in which case the elementary stream is structured as a Packetized Elementary Stream (PES). The individual units, or packets, are known as PES packets, which can be of large and variable size. The MPEG-2 Systems standard defines generic structures for PES packet formats and specifies particular rules for creating PESs from digital video and audio elementary streams. Allowance is made for creating PESs for private data formats, i.e., data formats not defined by the MPEG-2 Systems standard.

The MPEG-2 Systems standard defines two methods of creating a multiplex of PESs. In a Program Stream (PS), all components in the multiplex are assumed to belong to a single "Program", that is, a collection of elementary streams which may sensibly be presented as a unity to a user, all components being referenced to a common time base, together with certain coordinating control information. PES packets from component PESs are multiplexed by PES packet. The PS is rigidly structured so that at most one PES of a specified format may carry a private data elementary stream.

In a Transport Stream (TS), the components of the multiplex may belong to many programs. Each PES is assigned a "packet identifier" (PID). A sequence of packets identified by the same value of the PID field represents a single service component, typically a video or an audio component, or a user data component. The PES packets are broken into small, fixed-size units called transport packets, which may be multiplexed with transport packets from other PESs. The Transport Stream is transmitted at a constant rate, the transport rate, which is sufficient to accommodate the bandwidth requirements of all components carried within the Transport Stream. Since the transport rate may, either momentarily or in aggregate, exceed the bandwidth requirements of the constituent component, the MPEG-2 Systems standard has reserved PID 0x1FFF as the "null PID". Packets in this PID are "null packets" and do not carry any component. An MPEG decoder may discard them with impunity.

Coordination and control of the PESs and the Programs in the TS is managed via control data called Program Specific Information (PSI). PSI is structured as a set of tables according to a section format which differs from and is incompatible with the PES packet. The defined tables include the following:

A Program Association Table (PAT) is carried in PID 0, which is reserved exclusively for this purpose. The PAT identifies the Programs or services available via a program_number field, and, for each service, identifies the PID carrying the PMT applicable to that service.

A Program Map Table (PMT) for each service is carried in a PID identified within the PAT. The PMT identifies all the components belonging to the service and may provide additional information describing the components.

A Conditional Access Table (CAT) is carried in PID 1, which is reserved exclusively for this purpose. The CAT identifies PIDs carrying authorization streams for decoders implementing different conditional access systems. This information may include Entitlement Control Messages (ECMs) or Entitlement Management Messages (EMMs) used for encryption and authorization.

In addition, the Digital Video Broadcasting (DVB) committee has defined a number of additional tables for transport of Service Information (SI), including a Service Definition Table (SDT).

Thus, a Transport Stream can be understood as a multiplex of service components combined with descriptive service control information. However, the MPEG-2 Systems standard does not define how the Transport Stream multiplex is to be formed.

SUMMARY OF THE INVENTION

It is desirable to be able to combine two or more transport streams into a single transport stream that contains all of the components of the source transport streams. A problem encountered in combining transport streams is that the transport stream PIDs associated with one source stream typically conflict with the PIDs associated with one or more other source streams. Other identifying information, such as the program_number, assigned to a service may also conflict with that assigned to a service in another transport stream. Additionally, multiplexing two transport streams may cause embedded timing information, such as the Program Clock Reference (PCR), to be rendered inaccurate.

The above and other problems are solved by the multi-service transport multiplexing apparatus and method of the present invention. The present invention defines a process for creating a transport stream by addition of services, one at a time, to a pre-existing transport stream multiplex. The invention provides a capability for building a common set of service control information from the service control information tables of the individual streams being combined that avoids PID conflicts.

Accordingly, apparatus for multiplexing transport streams includes first and second transport demultiplexers for demultiplexing first and second input transport streams to their respective service components and service control information tables. Each demultiplexer filters the respective service components and service control information tables according to a particular filter set that specifies PID processing actions. A processor coupled to the first and second demultiplexers comprises means for examining the first and second service control information tables to determine whether any PID of one of the first and second transport streams overlaps or conflicts with any PID of the other of the first and second transport streams. The processor further includes means for generating output service control information tables from the first and second service control information tables that have been modified to avoid any overlapping or conflicting PIDs. The processor further provides the first and second filter sets to the first and second demultiplexers based upon the output service control information tables. A transport remultiplexer coupled to the processor and the first and second demultiplexers multiplexes the output service control information tables and the filtered first and second service components to provide an output transport stream.

According to an aspect of the invention, the processor changes or discards PIDs that overlap or conflict in the input transport streams.

According to another aspect of the invention, an encoder is combined with a transport multiplexer to provide an encoder/multiplexer. The encoder encodes a program source to provide a local transport stream. The transport multiplexer multiplexes the local transport stream with an input transport stream to provide an output transport stream. First and second encoder/multiplexers are series coupled wherein the output transport stream of the first encoder/multiplexer is coupled to provide the input transport stream to the multiplexer of the second encoder/multiplexer. Additional encoder/multiplexers can be series coupled to provide a daisy-chain configuration. In this manner, a general solution to the generation of a multi-service transport stream can be provided from the multiple local streams. In a preferred embodiment, a bypass circuit couples the input transport stream directly to the output transport stream which is activated in the event of failure of a given encoder/multiplexer.

According to another aspect of the invention, one or more redundant encoder/multiplexers can be connected in series at the end of a daisy-chain configuration to provide a hot-spare redundant mode of operation. The redundant encoder/multiplexer monitors the input transport stream to determine whether a failure has occurred in an upstream encoder/multiplexer. Upon a failure, the program source associated with the failed encoder/multiplexer can be switched to the redundant encoder/multiplexer which encodes the program source to provide a redundant local transport stream for multiplexing with the input transport stream.

In accordance with the present invention, a method of transport stream multiplexing includes receiving first and second transport streams, wherein each stream comprises a multiplex of service components and service control information, and demultiplexing the received transport streams to provide first and second demultiplexed transport streams. First and second service control information is extracted from the respective first and second demultiplexed streams and a determination is made whether any overlap or conflict exists between the first and second service control information. Output service control information is generated from the first and second service control information modified to avoid any overlap or conflict. The demultiplexed streams are filtered according to the output service control information. The output service control information and the filtered demultiplexed streams are then multiplexed to provide an output transport stream.

While the preferred embodiments are described with reference to MPEG-2 Systems standard Transport Streams, the principles of the present invention are intended to encompass the multiplexing of any data streams that comprise fixed length packets and have a self-contained directory structure which describes the multiplex. Thus, while the term "transport stream" is used herein to denote a Transport Stream as defined by the MPEG-2 Systems standard, the principles of the present invention are also applicable to systems using similar transport structures such as Asynchronous Transfer Mode (ATM) systems.

The principles of the present invention also apply to a configuration in which an output of the last multiplexer in the chain is provided as the first transport stream to the first multiplexer in the chain to form a ring, and in which each multiplexer is extended to provide a feedback path to the encoder for relaying information that is passed around the ring concerning the bandwidth requirements of all other participating encoders, in order to provide bandwidth allocation by statistical multiplexing.

According to another aspect of the invention, an optimal multiplexing method is provided which allows buffers to be two packets in depth. Accordingly, for a plurality of buffers, each buffer associated with a packetized data stream, packets are received at respective buffer input rates. The buffers are serviced at a service rate at least equal to a sum of the buffer input rates. For each buffer, once a full packet has been received therein, a time interval until that buffer is expected to reach its buffer depth is determined. The buffer having the least time interval is then serviced first, such that overflow of the buffers is avoided.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
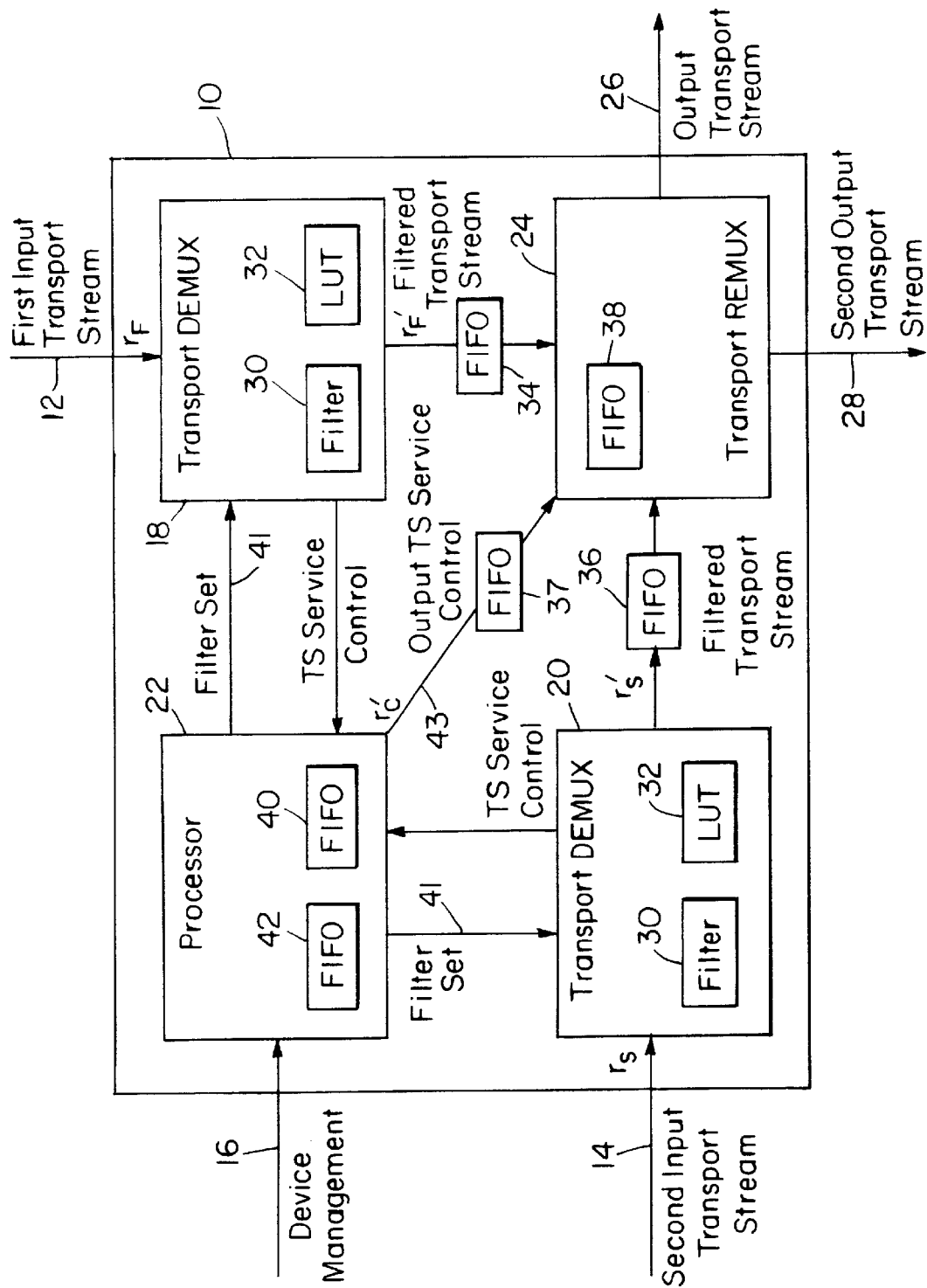
FIG. 1 is a schematic block diagram of an elementary transport multiplexer in accordance with the present invention.

Referring now to FIG. 1, an elementary two-stream multiplexer 10 is shown which illustrates the principles of the present invention. The elementary multiplexer 10 receives as input two transport streams on lines 12 and 14, respectively, which have been fully formatted externally to the multiplexer. The multiplexer 10 also receives on line 16 management and control input that is used to configure the multiplexer as described hereinbelow.

The elementary multiplexer 10 comprises four processing elements: a pair of transport demultiplexers 18, 20; a processor 22; and a transport remultiplexer 24. The demultiplexers 18, 20 demultiplex the transport streams to their constituent service components and service control information tables. The service control information tables are routed to the processor 22 which combines and reconfigures the information contained in the tables to provide a single set of output service control information tables. The demultiplexers 18, 20 filter the service components based on the combined and reconfigured information in the service control information tables. The transport remultiplexer 24 multiplexes the output service control information tables with the filtered streams to provide an output transport stream on line 26. A copy of the output transport stream may optionally be made available on line 28.

As noted above, the input transport streams 12, 14 have been fully formatted externally to the multiplexer 10. As described further hereinbelow, one of the input streams 12, 14 can be generated by a local encoder while the other can be an output transport stream from a separate multiplexer. In general, one or more of the PIDs of one input transport stream 12, 14 will conflict with the PIDs in the other input stream 12, 14. To avoid this conflict, the multiplexer 10 of the present invention preferably re-maps or changes the PIDs for every conflicting packet to a new value that avoids the conflict before it is passed on to the output stream 28. This process is referred to as automatic PID re-mapping. Other modes of managing this conflict include transparent PID re-mapping and hot-spare redundant PID re-mapping. The transparent mode simply passes all of the components from both input streams 12, 14 whether or not there is a conflict. In the transparent mode, it is then up to an external management system to ensure that the components in each stream 12, 14 do not conflict. The hot-spare redundant mode disables components of the second input transport stream 14 as long as all components declared by the PSI and SI tables to be present in the first transport stream 12 are detected to be present. If the loss of any such components is detected, then the missing component is replaced with the component of corresponding type from the second input transport stream 14, which is assigned the PID properly belonging to the missing component. Each of these operational modes is useful for differing configurations and are described further hereinbelow.

Each demultiplexer 18, 20 receives one of the two input transport streams and includes a set of programmable filters 30 that specifies for each input PID how transport packets identified by that PID value are to be processed by the demultiplexer. Four possible actions can be specified:

1. discard the packet entirely,
2. route the packet to the processor,
3. route the packet to the transport remultiplexer, or
4. route the packet to both the processor and the transport remultiplexer If an input PID is to be routed to the transport remultiplexer 24, the value of the PID may be changed according to a programmable Lookup Table (LUT) 32 held by the demultiplexer 18, 20. The LUT 32 is programmed by the processor 22 either automatically, as described below, or through the intervention of an external system such as a management system.

The default destination for an unused PID is to remove it from the transport stream entirely. If a particular PID is not defined in the output PAT, the output PMTs or the output CAT, then the entry for that PID in the LUT 32 is set to remove all of the packets with that PID from either transport stream entirely. Packets with undefined PIDs are not allowed to reach the output transport stream.

The LUT 32 also includes a thirteen bit output field that is substituted to set the PID value for the packet in the output transport stream. The default value for this field is the input PID value. It may be changed to some other value in the event a conflict is detected between PIDs in both transport streams.

Packets routed to the transport remultiplexer 24 are time stamped and placed in FIFO buffers 34, 36 which are read by the transport remultiplexer 24. Packets containing control tables routed to the processor 22 are placed in control FIFOs 40, 42. Packets generated by the processor 22 to transport control tables for the output transport stream are placed in a control FIFO 37, which is read by the transport remultiplexer 24. All packets read by the transport remultiplexer are then placed in output FIFO 38.

The processor 22 is responsible for configuring the LUT 32 and the PID actions performed by the demultiplexers 18, 20 by means of setting the PID filters 30 using Filter Set commands 41 according to the modes selected by the external management device. To initialize the LUT 32, the processor 22 begins by setting all of the PID Look-up Table destination field entries in both transport streams to none (no output).

Next, the processor 22 enables the destination field entries for the PAT (PID=0x0000) from each transport stream to route all PAT packets to the processor 22 only. The PATs from each transport stream are read and all of the PIDs for all of the PMTs are collected. The same process is performed for the CAT (PID=0x0001) to obtain the PIDs used for CA streams. The destination fields for the PID entries for all of the PMT PIDs are then set to read the PMTs to the processor only. Finally, the PMTs are interpreted to obtain a complete list of the PIDs used by all of the streams defined in the PMTs. At this point, the processor 22 can check for PID conflicts between the two transport streams and resolve them according to whether the system is in automatic PID re-map mode or hot-spare redundant PID re-map mode. Then the entries in the PID Look-up Table for these PIDs are set up for the appropriate destinations and PID re-mappings.

The processor 22 causes the demultiplexers to route the control tables contained within the input transport streams to it, including at least the PAT, the PMTs and the CAT. In a DVB-compatible system, the processor 22 also causes the SDT and other DVB tables to be routed to it. Optionally, the processor 22 may extract transport packets contained in other PIDs.

Certain of these tables (e.g., the PAT) are routed exclusively to the processor 22, while certain others (e.g., the PMTs) are either routed to the processor or to both the processor and the transport remultiplexer 24, depending on circumstances described hereinbelow.

By examination of the PAT, CAT and PMTs, the processor 22 determines whether any PIDs used in either transport stream are also used in the other. Depending on the specific operational mode (i.e., automatic, transparent, or hot-spare redundant re-mapping), the processor 22 may either cause one or the other such PID value to be changed or discarded.

By examination of the PATs, the processor 22 also determines whether any program_number used in either transport stream is also used in the other. Again, subject to operational mode, the processor 22 may either cause one or other such program_number value to be changed or discarded. Any change to a program_number effected in the PAT requires a change to a corresponding service_number in the SDT in DVB-compatible systems. In addition, other DVB tables, e.g., the Bouquet Association Table and the Event Information Table, may be managed and processed through the processor 22.

The preferred method of program_number and PID re-mapping in the automatic mode is to select the smallest unused value and assign it.

The processor 22 builds a PAT for the output transport stream, combining the PATs from the input streams, and incorporating any changes to PIDs used to transport PMTs or program_number values which may have occurred.

If PID remapping has occurred for a PID containing an EMM stream, or if a CAT is present in both input transport streams, then the processor 22 rebuilds the CAT for the output transport stream, otherwise the input CAT may be passed through unchanged. If PID remapping has occurred for a PID containing information other than a PMT or an EMM stream, the processor 22 rebuilds the PMT(s) describing the services containing the component(s) whose PID(S) have been remapped, otherwise the input PMTs may be passed through unchanged (subject to any PID remapping which may be applicable).

The processor 22 also rebuilds DVB tables as appropriate, if such tables are present. The tables created by the processor are formatted as a sequence of transport packets which are then placed into a FIFO 38 for transmission by the transport remultiplexer 24.

The transport remultiplexer 24 reads each transport packet from the FIFOs 34, 36, 38 and determines how long the packet has been delayed within the multiplexer by reading the multiplexer's time stamp placed onto the packet when it arrived at the input and comparing it to the present time. The Program Clock Reference (PCR) field is adjusted to compensate for this delay if necessary, as specified by MPEG-2, and then the remultiplexer 24 transmits the packet.

It can be shown, as described hereinbelow, that, if the sum of the input data rates and the data rate of control packets generated by the processor 22 does not exceed the data rate generated by the output remultiplexer, then the depth of each of the FIFOs 34, 36 and 37 can be made as small as two transport packets. If these conditions are met on average, but the sum of the input data rates may, on a burst basis, exceed the output data rate, then larger FIFOs will be needed in order to ensure that no transport packets are lost. The maximum FIFO depth is dependent on the maximum burst size in this instance.

The present invention provides a multiplexing method that is optimal because it requires minimum size buffers of two packets and, therefore, introduces minimum delay. However, it may be desirable to increase the buffer sizes to three packets to account for clock jitters and other imperfections in the system. In general, the optimal multiplexing method of the present invention can be applied to any multiplexing system with N-input packetized data streams of packet size P.

In the preferred embodiment, the multiplexer 10 receives transport packets in the first and second input transport streams at fixed rates $r_F$ and $r_S$ respectively. As noted above, the demultiplexers 18, 20 and processor 22 route transport packets to FIFO buffers 34, 36, 37 respectively. We denote by $r_F'$, $r_S'$ and $r_C'$ the rates at which data reach the respective FIFOs. The rates $r_F'$ and $r_S'$ are less than the original input data rates $r_F$ and $r_S$. Once a packet reaches FIFOs 34, 36, 37, the packet bits are clocked into the buffers with rates $r_F$, $r_S$, $r_C$ respectively. The service rate R at which the transport remultiplexer 24 services the buffers 34, 36, 37 is such that $$R \geq r_F + r_S + r_C$$

It is helpful to imagine the worst case where there are no gaps between packet arrivals. In this case, bits are being loaded into each of the FIFOs at the constant rates $r_F$, $r_S$ or $r_C$, respectively. In this worst case, there exists an optimal service algorithm such that the buffers are of minimum two-packet size. As it is known, the delay introduced by a multiplexing system increases when buffer size increases. Therefore, the optimal service policy introduces the minimum delay. Such a small delay is desirable in an MPEG stream, since it can provide a higher performance at the decoder level.

Starting with size 2 buffers, the present invention provides a service policy wherein at any service time, if none of the buffers has a full packet, a null packet is sent until at least one of the buffers reaches the packet size P or exceeds P. Then, the buffer with the least time left until overflow occurs is serviced first. If more than one buffer has the same minimum time, then the buffer with the fastest input rate is serviced first.

Figure 2A:
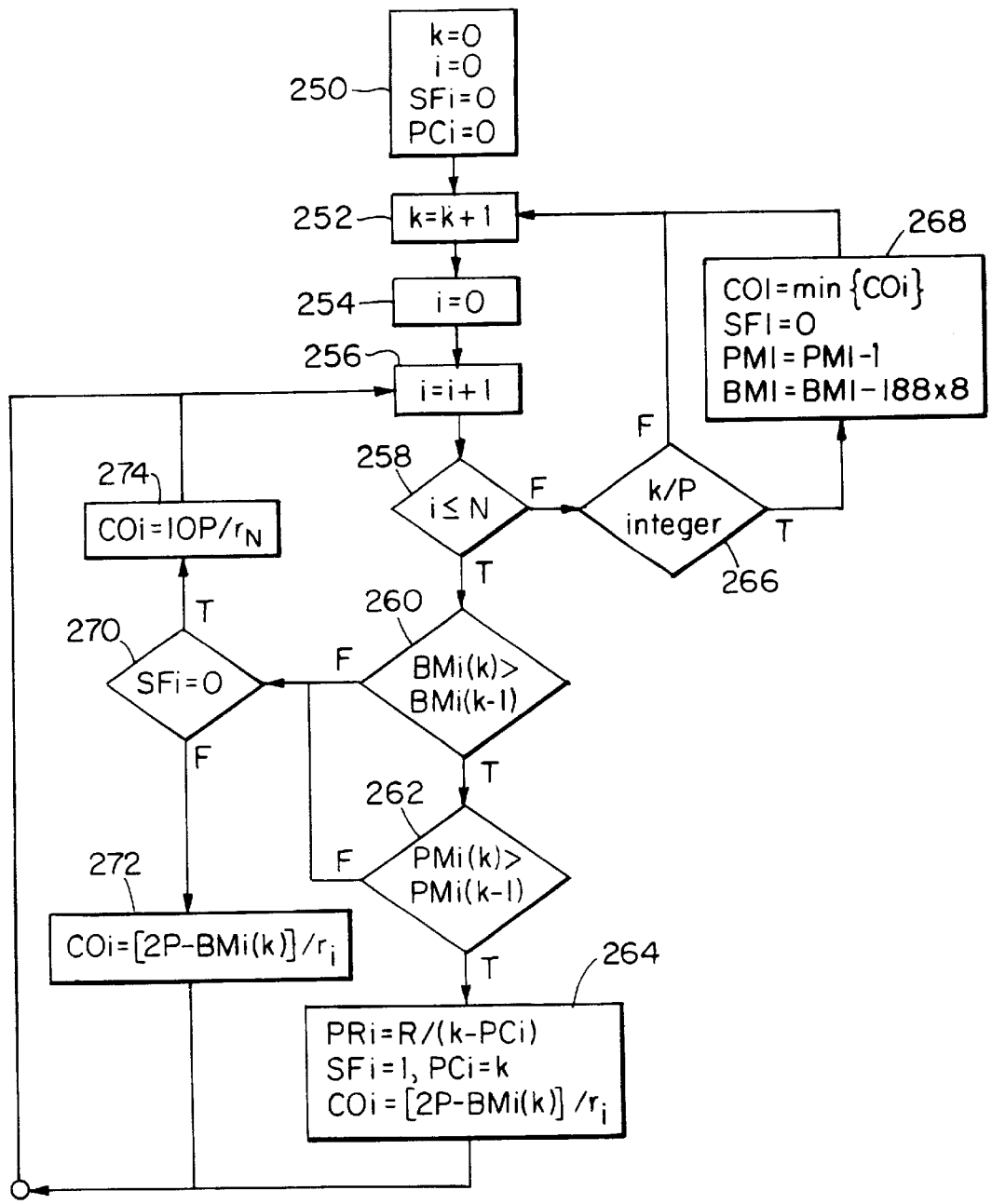
FIG. 2A is a flow diagram of a multiplexing method in accordance with the present invention.

FIG. 2A outlines the steps involved in the optimal service algorithm. In the general case of N input FIFO buffers $B_i$ with respective clock rates $r_i$ (i=1,2 . . . N), the rates are ordered such that $r_1 \geq r_2 \geq \ldots \geq r_{N-1} \geq r_N$. Packets reach the buffer $B_i$ at random intervals, but once a packet reaches the buffer the bits are loaded at the rate $r_i$ without interruption.

The time axis can be digitized to intervals of size 1/R, with the index k referring to the time $t_k$=k/R seconds. Starting with an initial state of buffer meter BMi(0)=0 bits, time is incremented from $t_k$ to $t_{k+1}$, i.e., k→k+1 at steps 250, 252. During the interval [$t_k$, $t_{k+1}$] at step 256, the algorithm performs the following functions on each of the N buffers:

The algorithm checks if another bit has been added to the buffer $B_i$ i.e. if BMi(k)>BMi(k−1) at step 260. At step 270, if BMi(k)=BMi(k−1), that is, no new bits are inserted in the $i^{th}$ buffer, the algorithm checks if the buffer can be serviced. If the buffer cannot be serviced, a relatively long time interval is associated with the buffer to ensure that it will not be serviced, for instance, COi, the time left until buffer overflow, is set to COi=10*P/$r_N$ at step 274. If the buffer can be serviced, then the time COi is unchanged because the buffer size BMi(k) is the same as BMi(k−1).

If BMi(k)>BMi(k−1), then the number of full packets is checked at step 262. The algorithm checks if another packet has been added to the buffer $B_i$, i.e., if PMi(k) >PMi(k−1). If PMi(k)=PMi(k−1), i.e., the number of full packets is the same, then the algorithm checks if the buffer could be serviced at step 270. If the buffer cannot be serviced (SFi=0), then the time left until the $B_i$ buffer overflows is set to COi=10*P/$r_N$ at step 274. If the buffer can be serviced (SFi=1), i.e., the buffer includes at least one full packet, then the algorithm decreases the time left until the $B_i$ buffer overflows by updating the equation COi=(2P−BMi(k))/$r_i$ at step 272. If PMi(k) >PMi(k−1) at step 262, i.e., the number of full packets is increased by one, then, the Packet_Rate_i is computed by evaluating PRi=R/(k−PCi), the Packet_ Count_i is updated PCi=k and the time left until the buffer $B_i$ overflows is set as COi=(2P−BMi(k))/$r_i$, and flag SFi=1 is set at step 264.

The buffer with the minimum COi is serviced first. After analyzing all N buffers, the algorithm checks if the time $t_{k+1}$ is a multiple of P/R, i.e., a full packet can be serviced at step 266. If true, the algorithm compares the times COi and services the buffer with the minimum COi that is less than $10*P/r_N$. If the I buffer is serviced, where I is set to the value of i having the minimum COi, then the Service_Flag_I is reset to zero (SFI=0), the Bits_Meter_I is decreased by 188×8 bits (BMI=BMI−188×8) and the Packet_Meter_I is decreased by one packet (PMI=PMI−1) at step 268.

The preceding method guarantees that PMi=0, 1 if the steps are performed during the interval $[t_k, t_{k+1}]$ of length 1/R seconds. In case the interval 1/R is too small, the optimal service algorithm can be modified to set time intervals of size 8/R, instead of 1R (8/R is the time it takes to service one byte, and 1/R is the time it takes to service one bit). Therefore, the index k refers to the time $t_k$=k 8/R seconds.

Further, the optimal service algorithm can be applied with P/R time intervals, instead of 1/R or 8/R, and buffers of size 2-packets will not overflow (PMi=0). However, P/R could be very tight to update the FIFOs status.

The foregoing terms are summarized in the following table:

| | |
|---|---|
| $r_F'$, $r_S'$ or $r_C'$ | The data rates at which packets reach the FIFOs 34, 36, 37 respectively (bits/s) |
| $r_F$, $r_S$ or $r_C$ | The clock rates at which the bits of a given packet are loaded into the FIFOs 34, 36, 37 respectively (bits/s) |
| R | The service clock rate at which bits of a given packet are being extracted from any of the FIFOs 34, 36, 37 (bits/s) |
| P | The packet size, MPEG specification is 188 × 8 bits (bits) |
| SFi | Sercice_Flag_i: SFi = 0 implies that $B_i$ cannot be serviced, SFi = 1 implies that $B_i$ has a full packet and can be serviced |
| PCi | Packet_Count_i: Time at which a full packet has been inserted into the $B_i$ buffer (seconds) |
| COi | Count_overflow_i: The time left until overflow occurs in 2-packet size buffer $B_i$ (seconds) |
| BMi (k) | Bits_Meter_i: The size of the $B_i$ FIFO in bits (bits) |
| PMi(k) | Packet_Meter_i: The size of the $B_i$ FIFO in packets (packets), PMi = 0 or 1 |
| PRi | Packet_rate_i: the rate at which packets reaches the FIFO $B_i$ (packets/s) |

Figure 2B:
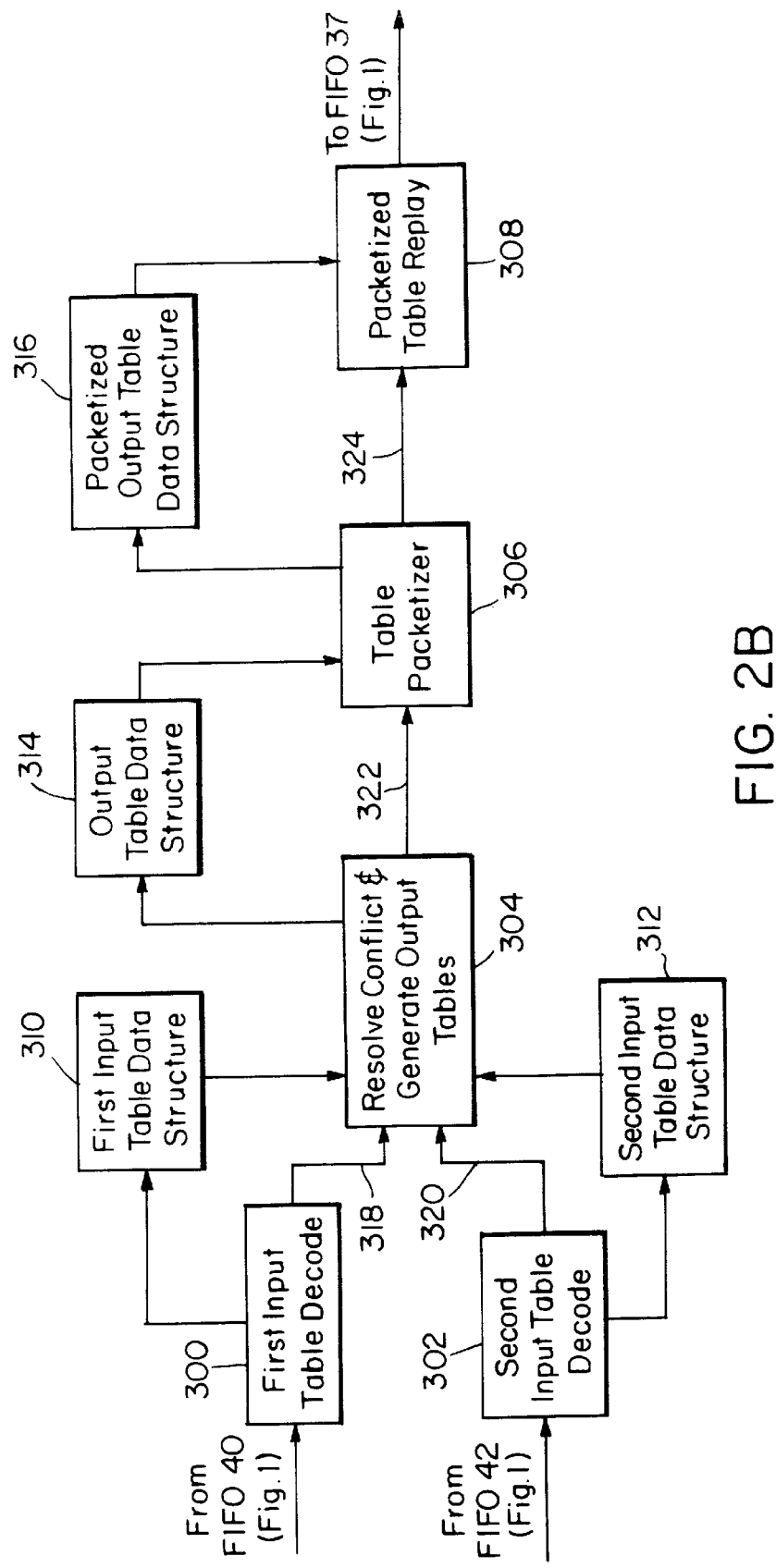
FIG. 2B is a flow diagram of table information processing in the elementary multiplexer of FIG. 1.

The processing of table information will now be described. The flow of table information in the processor 22 is shown in the flow diagram of FIG. 2B. This diagram traces the table information flow from the input FIFO buffers 40, 42 through processing blocks 300, 302, 304, 306, 308 and shared data structures 310, 312, 314, 316 to the output table buffer 37. The processor 22 reads table packets from the FIFO buffers 40, 42 in process blocks 300, 302 respectively. If the transport_error bit in the transport packet header is true, the packet is thrown away. If the packet is a copy of a previously received table packet, the packet is discarded. If it is new, the processor 22 checks it to verify that it was read correctly by computing the CRC at the end of each section. A signal that a change has occurred in the corresponding input table is sent on 318, 320 to block 304, indicating that the output tables require updating. The section is used to modify the corresponding version of the specified table maintained in the processor memory in block 304. The conflicts between the two input transport streams 12, 14 (FIG. 1) are resolved according to the operating mode (automatic, transparent, or hot-spare redundant). The output tables are generated accordingly and sent to Table Packetizer 306. The completed new version of a table is sent to a Packetized Table Replay 308 for continuous replay to the FIFO buffer 37 for inclusion in the output transport stream 28. The delay between receiving a new version of any input table to the forwarding of the updated version of the output table to buffer 37 is kept as short as possible.

Example algorithms for table regeneration performed by the processor 22 include the following:

Each table is maintained as a single section.

Upon obtaining the section, the processor 22 appends the descriptor for the service created by it, and adjusts the section_length and CRC_32 fields appropriately.

Each table is maintained as a set of sections, where each section describes the transport stream components being added. The processor 22 then increments the last_section_number field on all sections of the table received on the input transport stream, and adjusts the CRC_32 field appropriately. The processor also inserts a section containing the descriptors applicable to the components in the additional transport stream, giving it a section_number value equal to the last_section_number.

If the second input transport stream 14 is disabled for any reason, such as a PID conflict while in transparent or hot-spare redundant mode, then the transport demultiplexer 18 stops extracting table packets from the first input transport stream 12 and allows them to propagate directly through to the output transport stream 28 unchanged. This removes the propagation delay associated with PSI/SI table updates through the processor 22. While disabled, the multiplexer 10 continues to monitor some of the PSI packets by copying them to both the buffer 34 and the table buffer 40 so that the processor 22 can monitor which PIDs are presently assigned in the first input transport stream 12. This information is used by the PID re-mapping algorithm.

Figure 3:
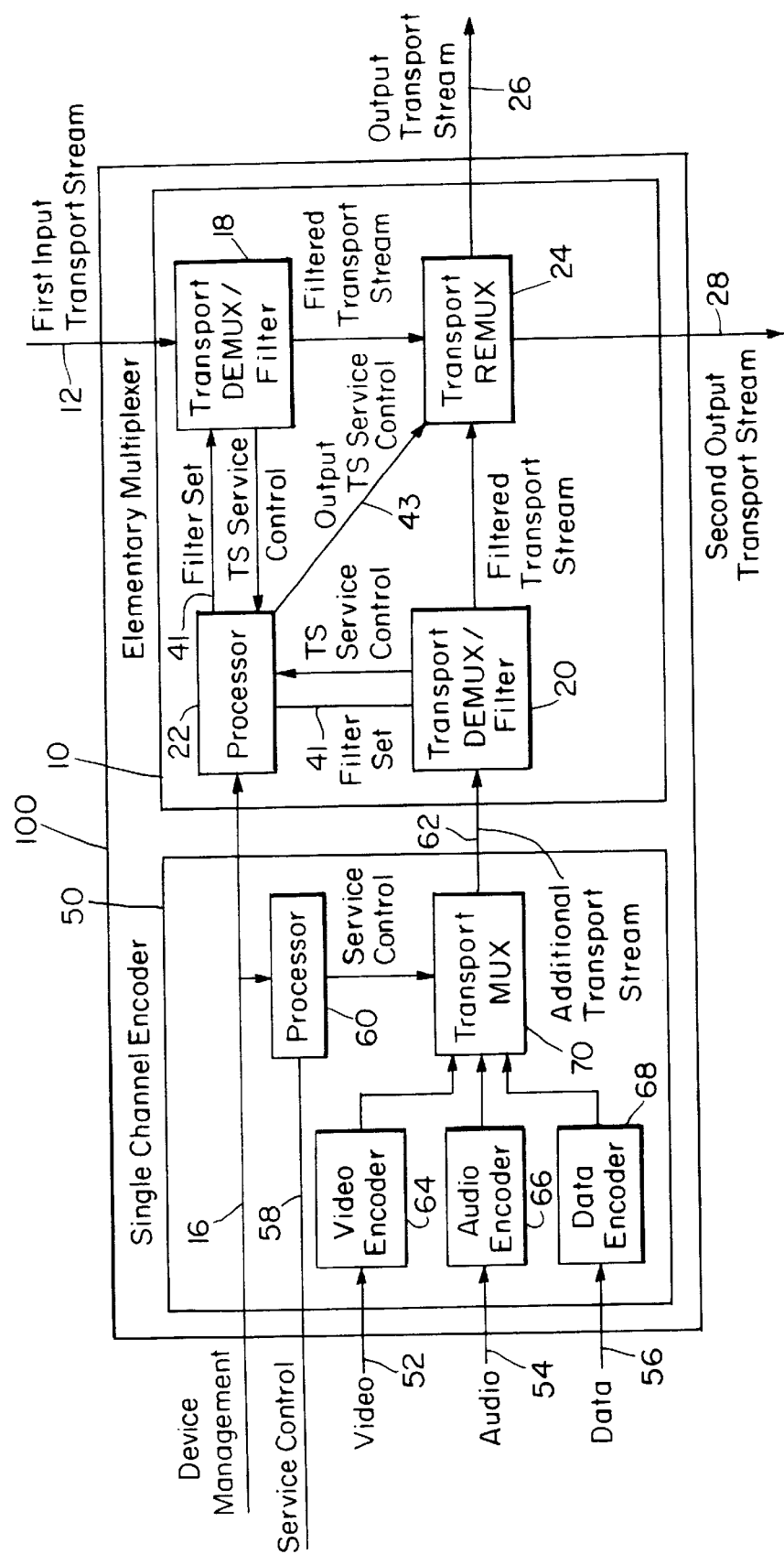
FIG. 3 is a schematic block diagram of a single-service encoder/multiplexer in accordance with the present invention.

The present invention may be used to provide a number of system architectures, as will now be described. In the simplest case, the elementary multiplexer 10 may be combined with a single channel encoder 50 to provide an encoder/multiplexer 100, as shown in the block diagram of FIG. 3.

The encoder 50 accepts as inputs on lines 52, 54, 56, a set of components to be inserted into a transport stream. A typical component set consists of a video input, two stereo audio channels, and two user data channels. Ordinarily, the set of components are intended to form a single service, although in some cases they may form more than one service. Service control data, describing and configuring the components and service(s) added to the multiplex by the encoder 50, is passed on line 58 to the encoder processor 60, which uses this information to create a set of tables to be inserted into an additional transport stream 62 generated by the encoder 50.

The components are each encoded, in a fashion specific to each component type, into a format suitable for inclusion in a transport stream by component encoders 64, 66, 68. Typically, this format will be based on the Packetized Elementary Stream (PES) encoding defined by MPEG-2. The encoded components are then passed to a transport multiplexer 70, wherein they are combined with each other and with the control tables provided by the processor 60 into the additional transport stream 62.

The additional transport stream 62 is then passed to the elementary multiplexer 10, which combines it with an externally supplied input transport stream 12, as described above, to create an output transport stream 26 which adds the contributions of the encoder 50 to the input transport stream 12. In the preferred embodiment, the input transport stream 12 is provided at a rate that is either fixed externally or is measured within the elementary multiplexer. The sum of this rate, the rates of the contributions of the encoder 50, and the rate of the output transport stream control tables 43 does not exceed the rate of the output transport stream 26 and 28. In an alternate embodiment, with the provision of sufficient FIFO to accommodate the presence of bursts of data other than null packets, the input transport stream 12 is provided at a fixed known rate, equal to the output transport stream 26, including bandwidth allocated to null packets that is sufficient to accommodate the service(s) being added by the encoder 50. The input transport stream 12 may indeed be absent, in which case it is considered to consist entirely of null packets. In the preferred embodiment, PID and program number conflicts are always resolved in favor of the input transport stream 12 over the additional transport stream 62.

Figure 4:
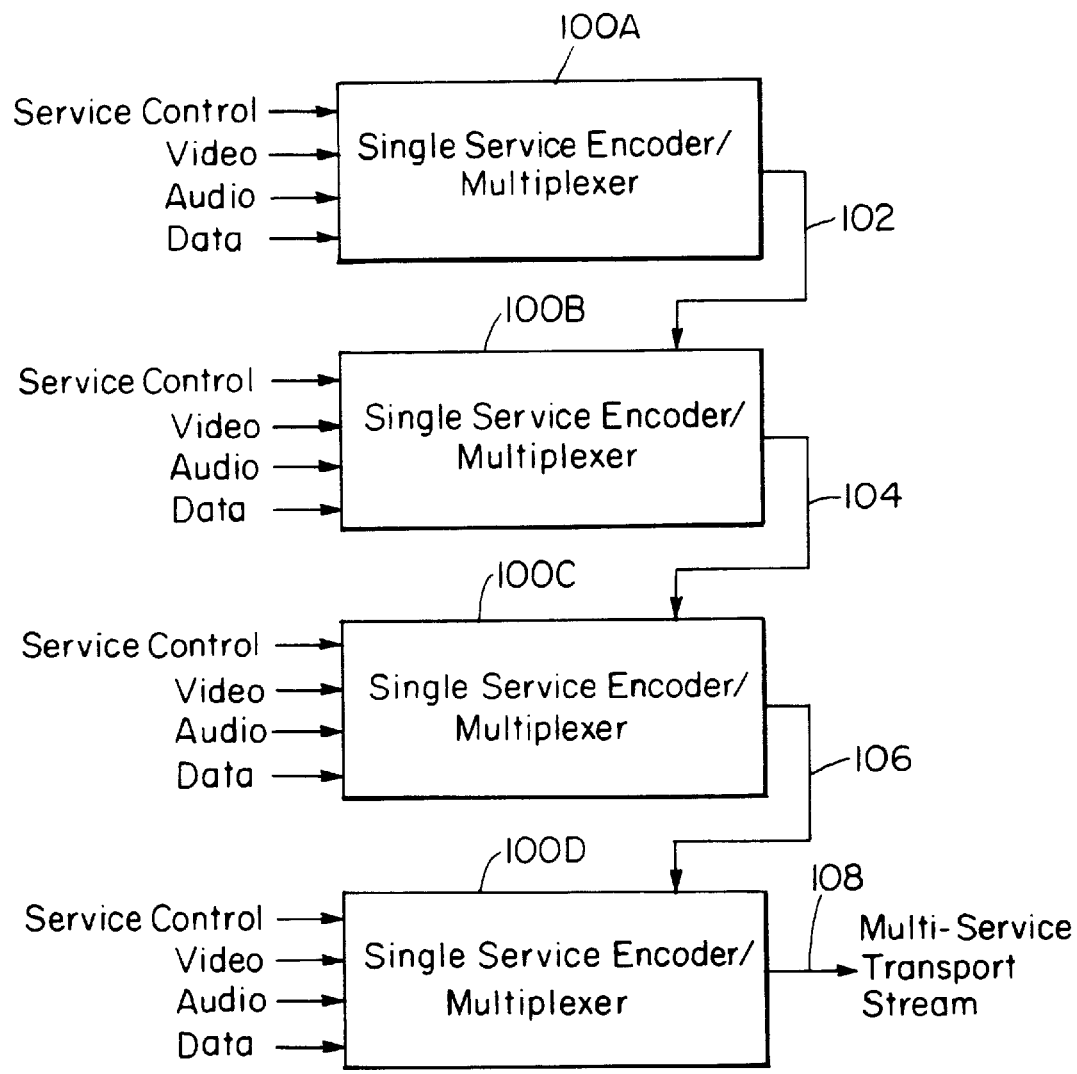
FIG. 4 is a schematic block diagram of a series configuration of single-service encoder/multiplexers of FIG. 2 in accordance with the invention.

A transport stream containing an arbitrary number of services can be provided by a set of encoder/multiplexers 100 of the present invention connected in series. In such a configuration, the output transport stream of each elementary multiplexer is provided as the input transport stream of the next. This configuration of encoder/multiplexers 100A, 100B, 100C, 100D is shown in FIG. 4. No input stream (or a set of null packets) need be provided to the first encoder/multiplexer 100A. The output of the last encoder/multiplexer 100D is the final transport stream 108. The number of encoder/multiplexers 100 which can be so daisy-chained together is limited only by the capacity of the transport stream and by any physical limitations imposed by the interface drivers.

A problem with automatic PID re-mapping is that the user may have a difficult time determining which encoder's PIDs have been re-mapped to which new values. For example, if the encoder 50 (FIG. 3) at the beginning of the chain fails, then the rest of the multiplexers 10 throughout the chain notice the transport stream from the first multiplexer 10 is gone and the rest of the chain will automatically readjust their PIDs. Another scenario is if the user decides to add an extra encoder to the end of the chain, or even if the user merely configures an extra audio or data channel to the encoder at the end of the chain. Then the extra PIDs associated with these extra services cause the multiplexers 10 throughout the rest of the chain to re-map their PIDs to accommodate these new PIDs. This constant movement of the PIDs in the output transport stream can cause problems for the decoders at the other end of a transmission link. For this reason, some users may prefer to map the PIDs for each encoder 50 by themselves, rather than letting the multiplexer 10 do so.

For those users, the multiplexer 10 can be put into either transparent mode or hot-spare redundant mode which leaves the PIDs in their original locations. If there is a PID conflict between the input transport stream 12 and the additional transport stream 62, then, in the case of hot-spare redundant mode, the transport stream 62 is disabled until the user manually changes the PID assignments throughout the chain to remove the conflicts. This allows the user to set up the PID assignments for the decoders at the other end of the link and know that the multiplexers 10 will not be reassigning the PID values whenever a problem occurs within any encoder 50 in the chain.

In the transparent mode, the two input transport streams 12, 14 are combined transparently with no regard for PID conflicts. If a PID conflict occurs between any of the elementary streams, the decoders receiving those elementary streams will fail, but the non-conflicting elementary streams in the multiplex will be unaffected. In this case, it is up to an external management system to resolve the conflicts by manually reassigning the input transport stream PIDs until no conflicts exist.

Figure 5A:
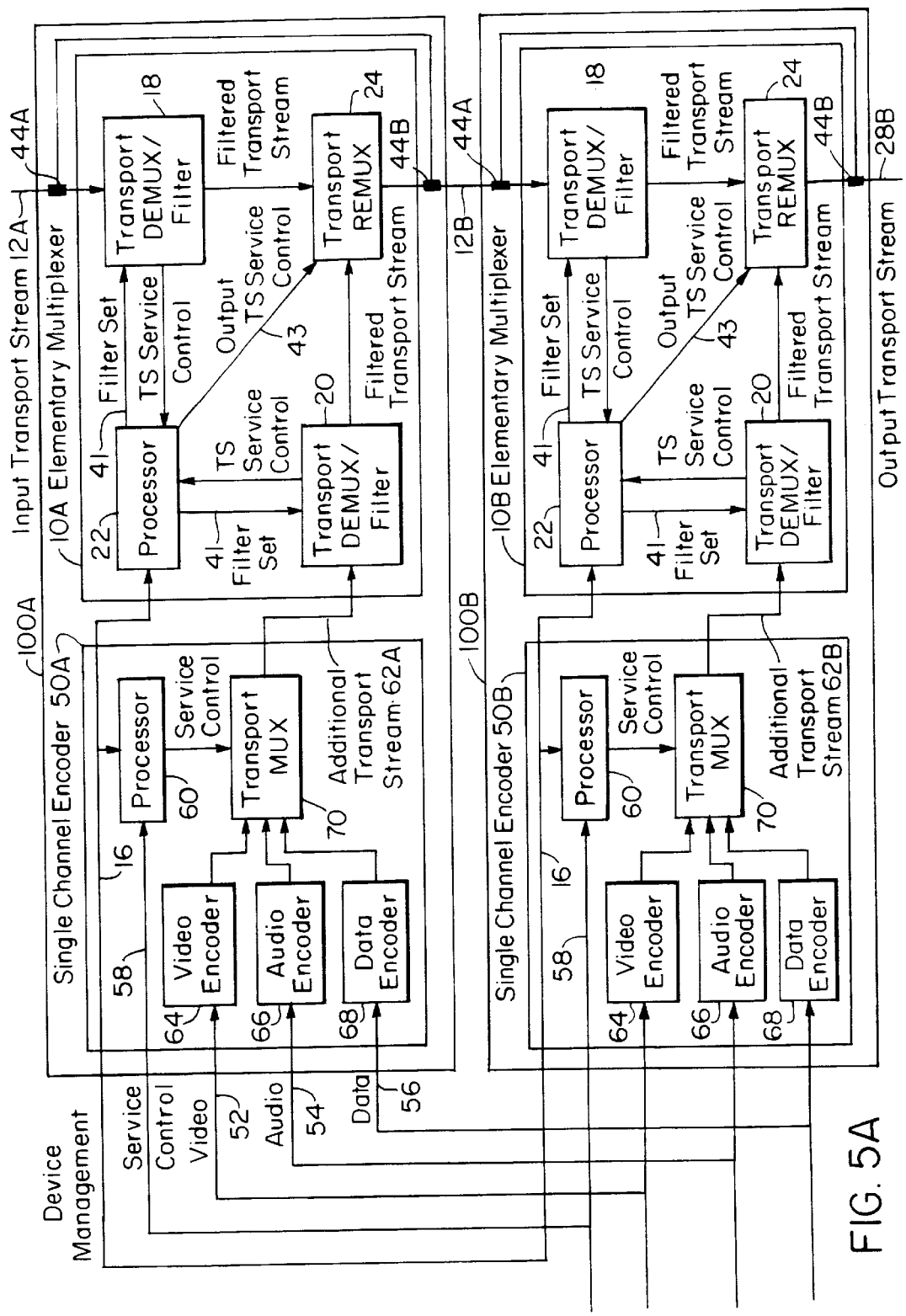
FIG. 5A is a schematic block diagram of a redundancy configuration of single-service encoder/multiplexers of the type shown in FIG. 3 in accordance with the invention.

Two encoder/multiplexers 100 incorporating the present invention, and each additionally equipped with a passive bypass relay 44A, 44B connecting the input transport stream directly to the output transport stream, can be used to provide a simple redundancy configuration, as shown in FIG. 5A. In this configuration, the elementary multiplexers 10A, 10B act as switches, each selecting one of two transport streams. The output of the second elementary multiplexer 10B can be provided to an external modulator (not shown).

In the configuration shown in FIG. 5A, the input of the first encoder/multiplexer 100A is left unconnected. If the elementary multiplexer provides two copies of the output transport stream, then the second output of the multiplexer 10A in the first encoder/multiplexer 100A may be used to drive a redundant modulator (not shown). In this configuration, the second output of the second encoder/multiplexer 100B is either unused or is used for monitoring purposes.

In order for this configuration to provide redundancy, identical video and audio input must be supplied to each encoder 50A, 50B, and each encoder must be configured to provide the same sets of PIDs to the services generated by the encoder. The multiplexers 10A, 10B are then configured so that the video and audio PIDs generated by the associated encoder 50A, 50B are discarded unless the same PIDs are absent on the input transport stream 12A, 12B respectively. This is the hot-spare redundant operational mode noted above. The absence of these PIDs can be determined through a timeout mechanism. Once a PID is determined to be absent, then the corresponding PID as generated by the local encoder 50A, 50B is passed through to the output transport stream until the PID is determined to be present on the external input transport stream 12A, 12B again. In an alternate embodiment, hot-spare redundant mode is triggered by detecting the absence of a service from the input PAT, rather than detecting loss of input PID.

In a system so configured, the output 62A of the first encoder 50A is normally passed through to the output stream of the second elementary multiplexer 10B. If the first encoder 50A or elementary multiplexer 10A fails, then the output 62B of the second encoder 50B is selected by the second elementary multiplexer 10B. If the second elementary multiplexer 10B fails, then the bypass relay 44A, 44B of unit 100B is deactivated and the output of the first elementary multiplexer 10A is passed directly to the output transport stream 28B. The relay 44A, 44B remains deactivated until either a power-up reset occurs or a command to reactivate the relay is received from a user interface (not shown).

Figure 5B:
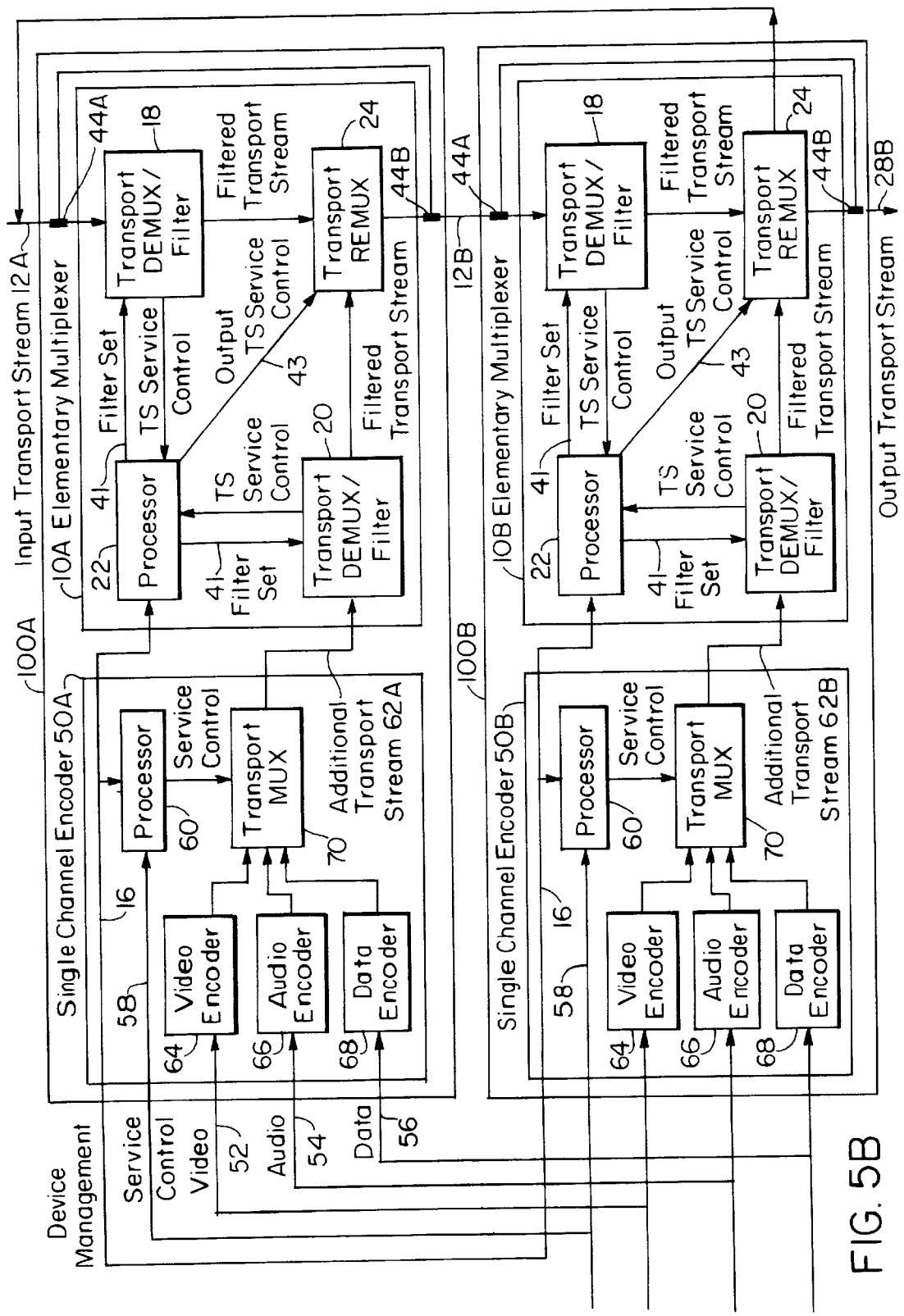
FIG. 5B is a schematic block diagram of another redundancy configuration in accordance with the invention.

In a variation of this scheme based on elementary multiplexers each providing two outputs, the second output transport stream of the second multiplexer 10B is connected to the input transport stream of the first multiplexer 10A as shown in FIG. 5B. The two multiplexers 10A, 10B must then be configured to operate differently. The first multiplexer 10A is configured to discard a PID received on the input transport stream 12A unless a corresponding PID in the transport stream 62A generated by the encoder 50A is not detected. The second multiplexer 10B is configured oppositely, that is, to discard a PID received on the transport stream 62B generated by the encoder SOB unless a corresponding PID in the input transport stream 12B is not detected. Successful operation of this configuration requires that the two encoder/multiplexers 100A and 100B are powered up or reset at different times.

Figure 6:
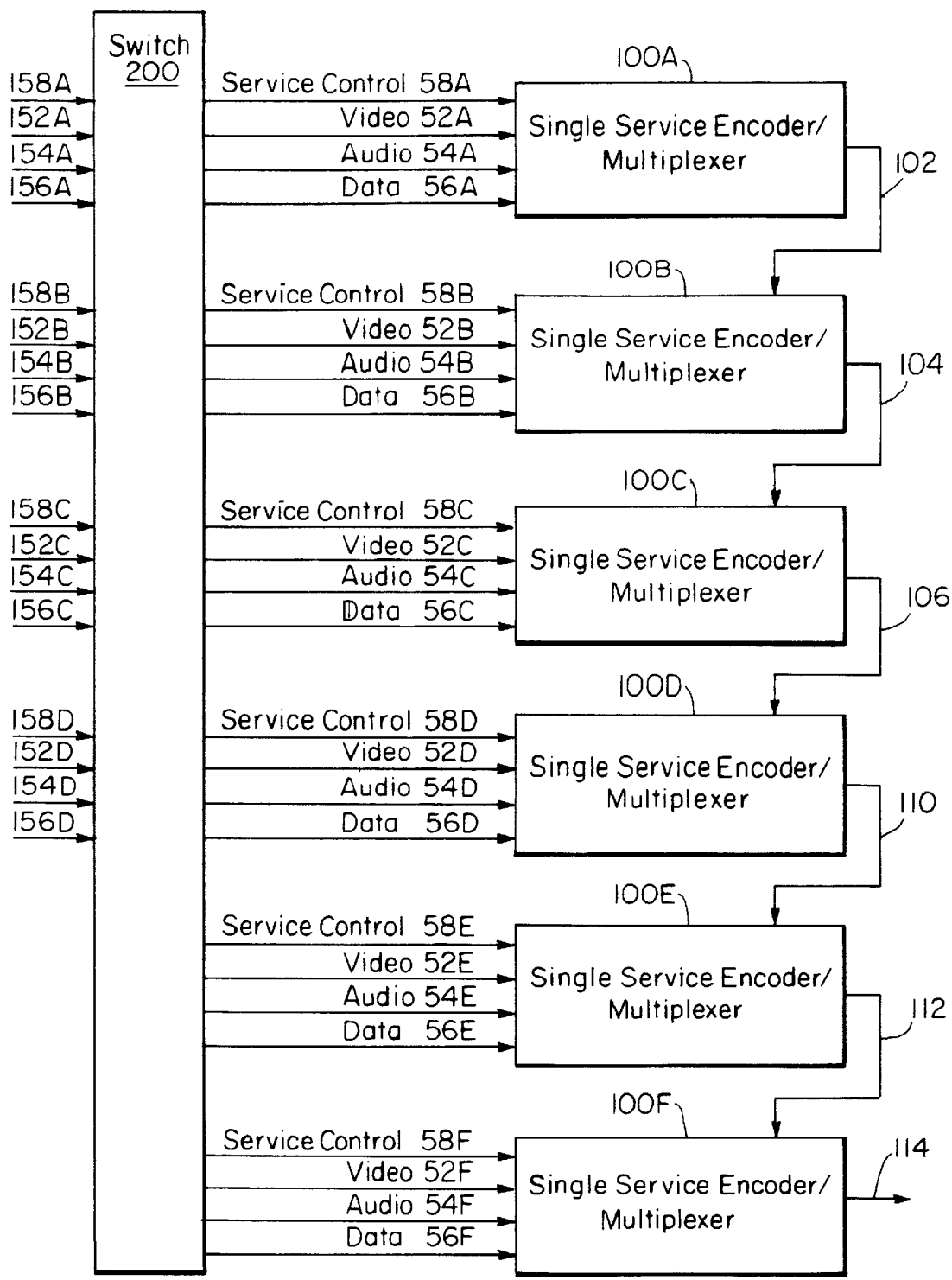
FIG. 6 is a schematic block diagram of an NxM configuration of encoder/multiplexers.

The automatic PID re-mapping mode can be combined with the hot-spare redundant mode, in conjunction with an external audio/video switch, to provide NxM redundancy or hot-spare redundant capability to the configuration of FIG. 4, as shown in FIG. 6. In this configuration, a chain of encoder/multiplexers 100A, 100B, 100C, 100D operate in the automatic re-mapping mode as described above for FIG. 4. The last encoder/multiplexers 100E, 100F are used to provide NxM redundancy, where N=4 and M=2 in this configuration. The output transport stream 102, 104, 106, 110, 112 of each elementary multiplexer is provided as the input transport stream of the next. A conventional crosspoint matrix switch 200 is configured to connect service control, video, audio, and data input signals 158A, 152A, 154A, 156A to respective inputs 58A, 52A, 54A, 56A of encoder/multiplexer 100A. The input signals for encoder/multiplexers 100B, 100C, and 100D are similarly configured through the switch 200. The input signals 58E, 52E, 54E, 56E and 58F, 52F, 54F, 56F of encoder/multiplexers 100E and 100F, respectively, are configured normally in a standby state until a failure occurs in one of the upstream encoder/multiplexers 100A, 100B, 100C, 100D. In the standby state, the encoder/multiplexers 100E, 100F monitor the tables in the chain on 110, 112 to determine the PIDs in use by upstream encoders, but do not normally insert any components.

If any PIDs associated with an upstream encoder/multiplexer (100A, 100B, 100C, 100D) are determined to be absent (via timeout), then encoder/ multiplexers 100E, 100F generate an alarm which is supplied to an external management system (not shown) or to the NxM audio/video switch, which then configures the NxM audio/video switch to route the missing component to either of the encoder/multiplexers 100E, 100F. A transport stream is created by the redundant encoder/multiplexer 100E, 100F using the missing PIDs, and then inserted into the output transport stream 112 or 114. The inclusion of M=2 redundant encoder/multiplexers 100E, 10OF provides backup of two of the N=4 source streams A, B, C, D. When the failed upstream encoder/multiplexer is restored, the redundant encoder/multiplexer 100E, 100F returns to the standby state.

The compression algorithms for video encoding defined by MPEG permit the bandwidth required by video components to be variable, according to the complexity of the scene being encoded, for a given level of picture quality. Therefore, it is possible to configure a system having average bandwidth requirements that meet the bandwidth available in a transport stream, but which may instantaneously exceed the bandwidth available in certain circumstances. One path to avoiding this problem is to ensure that the transport stream bandwidth supplied exceeds the peak needs of all input video streams, even if these occur simultaneously. However, this solution will normally waste bandwidth in the output transport stream.

In systems where these considerations are a concern, the present invention permits an optimization of the quality of the video encoding according to the bandwidth instantaneously available. That is, a tradeoff may be made between the ideal bandwidth for the set of video components and the actual bandwidth available, and one or more video components may be required to reduce their respective coding quality to that appropriate for a lower bandwidth, on an instantaneous basis. This aspect of the present invention is referred to as statistical multiplexing.

Figure 7:
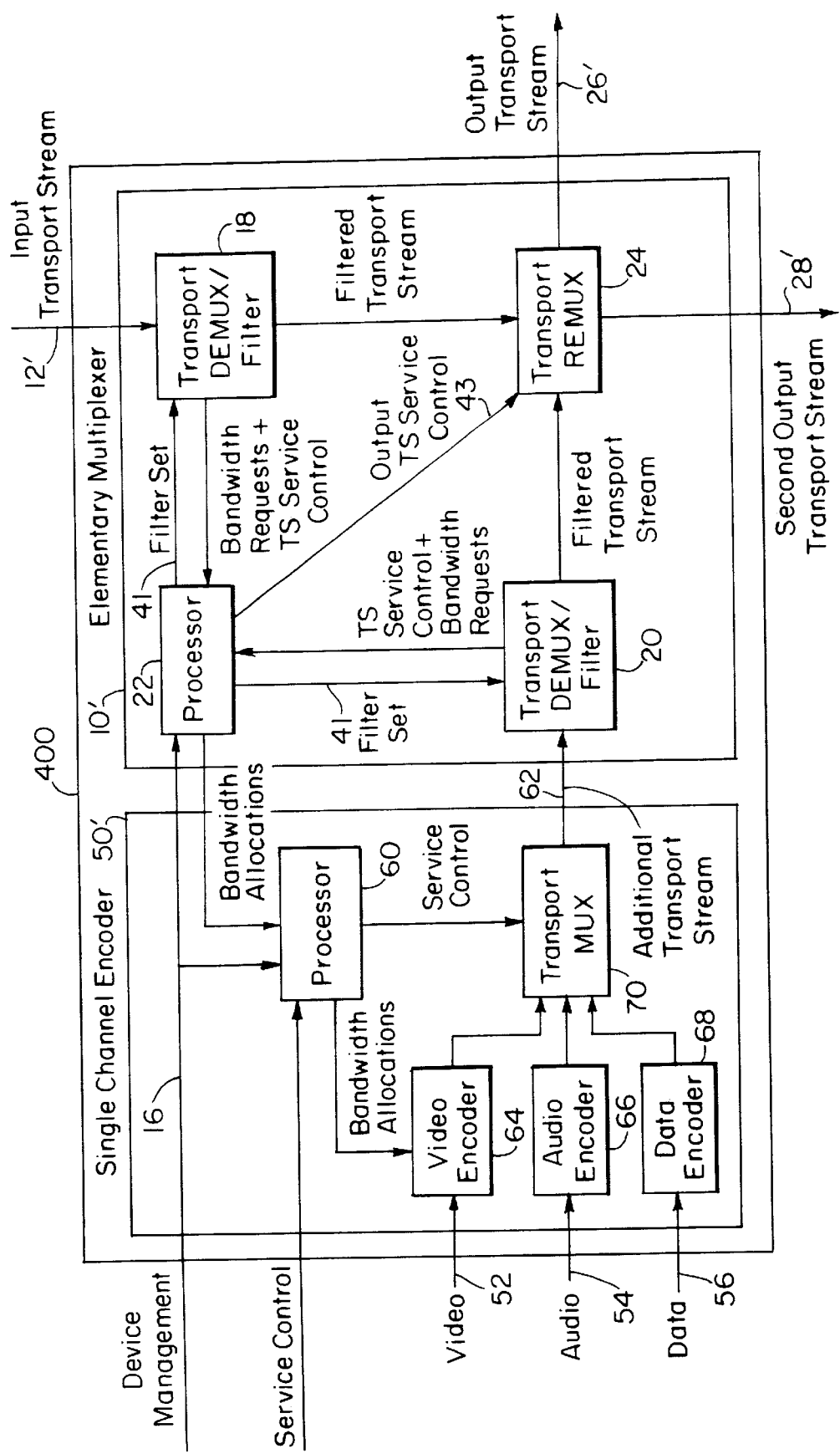
FIG. 7 is a schematic block diagram of a single-service encoder and elementary statistical multiplexer configuration of the present invention.

An embodiment of an encoder 50' combined with an elementary statistical multiplexer 10' embodying the present invention is shown in FIG. 7. The elementary statistical multiplexer 10' incorporates the features of the elementary multiplexer 10. In addition, to provide for bandwidth flexibility, the syntax of the transport stream is extended to include information about requests for bandwidth made by the encoder 50' and by other elementary statistical multiplexers. The Filter Set 41 is also extended to allow input bandwidth requests to be extracted from the input transport stream 12'. The processor 22 makes use of the Filter Set 41 to ensure that transport packets for all components inserted by the encoder 50' are discarded if they are present on the input transport stream 12'.

In operation, processor 60 of the encoder 50' notifies the processor 22 of multiplexer 10' of the bandwidth desired by the video encoder 64 in a local bandwidth request. The processor 22 determines a bandwidth allocation from the local bandwidth request and from bandwidth requests on the input stream 12' and then notifies the processor 60 of the bandwidth allocated to the video encoder 64. Similarly, any other component having a data rate sufficiently variable can participate in the statistical multiplexing process. The processor 60 may inform other elementary multiplexers of its bandwidth requests and bandwidth allocations via a packet inserted into the additional transport stream 62. In an alternate embodiment, the processor 22 may provide a packet to FIFO 38 (FIG. 1) to inform the other elementary multiplexers of its bandwidth requests and allocations.

In a preferred embodiment, two output transport streams 26', 28' are required which are identical in content. Optionally, one output can be structured to omit the bandwidth request and allocation data described below, so that this is not passed to decoders which are incapable of interpreting it, however, this is not necessary with the syntax used for this data in the preferred embodiment.

Figure 8:
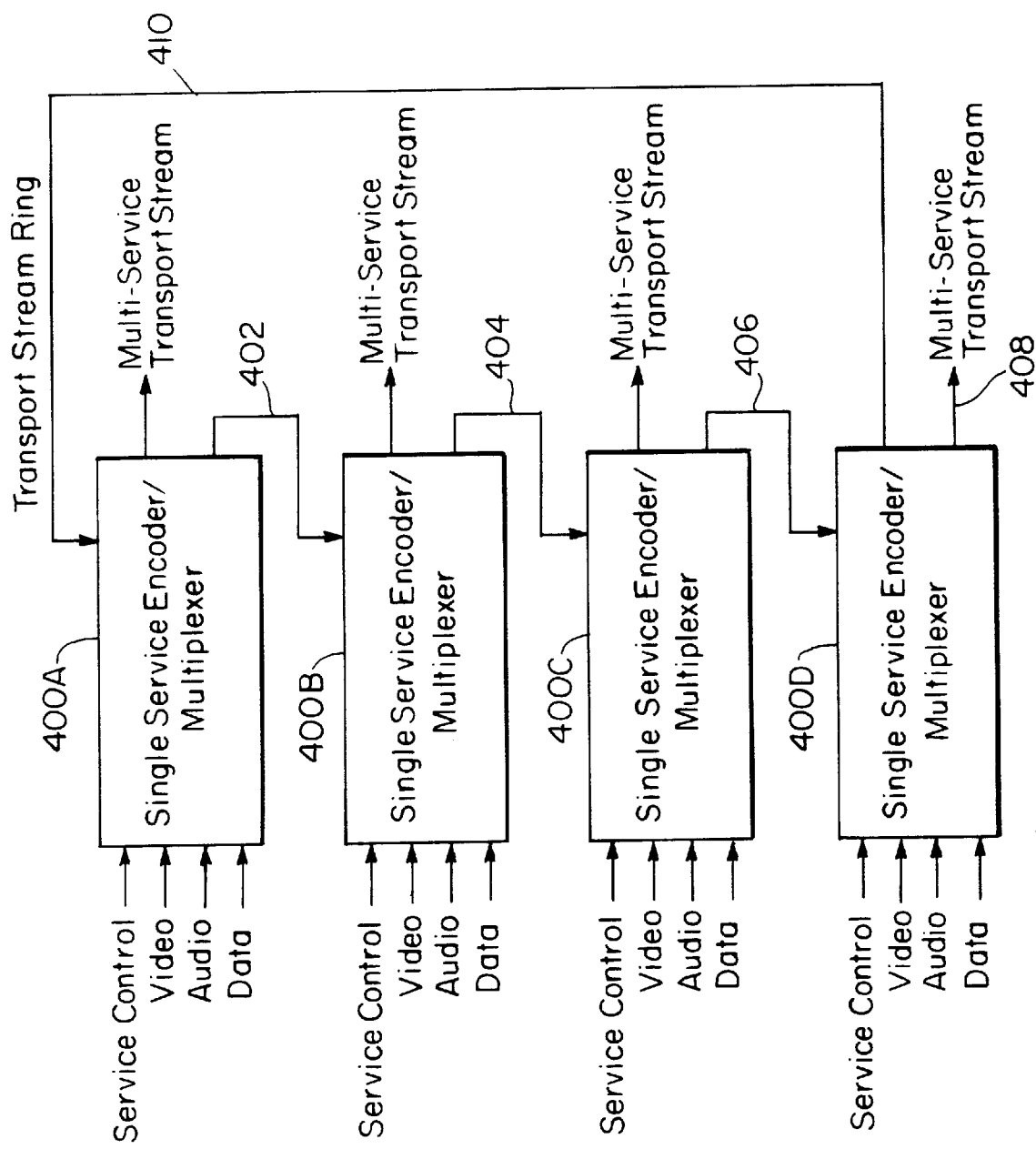
FIG. 8 is a schematic block diagram of a ring configuration of encoder/statistical multiplexers of FIG. 7 in accordance with the invention.

It is apparent from the foregoing disclosure that a set of encoder/elementary statistical multiplexers 400A, 400B, 400C, 400D may be connected in a ring, as shown in FIG. 8. By means of this arrangement, each encoder can be informed of the bandwidth requirements of other participating encoders. The transport stream resulting from the statistical multiplexing process may be obtained for purposes of transmission or further processing from the second output transport stream of any participating elementary statistical multiplexer. Each encoder/elementary statistical multiplexer 400A, 400B, 400C, 400D is provided with a unique identity to distinguish it from other participating encoder/elementary statistical multiplexers.

The bandwidth request data is passed around the ring in a message, using a delivery mechanism which is compatible with MPEG but transparent to MPEG encoders not embodying the demultiplex capability of the present invention. An example of such delivery means is a message contained in a packet contained in PID 0x1FFF (the null PID), the data_byte fields of which can take any value according to the MPEG specifications. By this means, it can be ensured that the presence of this packet in the output transport stream will be ignored by decoders which are incapable of processing it. At most, one set of bandwidth request data for each encoder is present on the ring at any given time.

The format for the bandwidth request packets, of the protocols for transmitting them, and the algorithms for processing them to determine actual bandwidth allocation can be modeled closely on similar procedures used in ring-based data networks, e.g., Token Ring or FDDI.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. For example, while the preferred embodiments have been described with reference to series coupled or chained encoder/multiplexer configurations, the principles of the present invention also apply to configurations in which both the first transport stream and second transport stream are provided to the multiplexer through external input ports.

What is claimed is:

1. Apparatus for transport stream multiplexing comprising:
   an encoder for encoding a program source to provide a local transport stream, the encoder including a first bandwidth request in the local transport stream indicating a desired bandwidth for encoding the program source;
   a multiplexer coupled to the encoder for multiplexing the local transport stream with an input transport stream to provide an output transport stream, the input transport stream including second bandwidth requests, wherein the multiplexer determines from the first and second bandwidth requests a bandwidth allocation to provide to the encoder indicating an actual bandwidth to use for encoding the program source, wherein the output transport stream includes the first and second bandwidth requests and the bandwidth allocation.

2. A transport stream multiplexing system comprising a plurality of elements connected in a ring, each element comprising:
   an encoder for encoding a program source to provide a local transport stream, the encoder including a first bandwidth request in the local transport stream indicating a desired bandwidth for encoding the program source;
   a multiplexer coupled to the encoder for multiplexing the local transport stream with an input transport stream to provide an output transport stream, the input transport stream including second bandwidth requests, wherein the multiplexer determines from the first and second bandwidth requests a bandwidth allocation to provide to the encoder indicating an actual bandwidth to use for encoding the program source and wherein the multiplexer includes the first and second bandwidth requests in the output transport stream, each output stream coupled to provide the input transport stream of the succeeding element in the ring.

3. The system of claim 2 wherein each output stream includes the bandwidth allocation.

4. A method of transport stream multiplexing comprising the steps of:
   encoding a program source to provide a local transport stream that includes a first bandwidth request indicating a desired bandwidth for encoding the program source;
   multiplexing the local transport stream with an input transport stream to provide an output transport stream, the input transport stream including second bandwidth requests;
   determining from the first and second bandwidth requests a bandwidth allocation indicating an actual bandwidth to use for encoding the program source, wherein the output transport stream includes the first and second bandwidth requests and the bandwidth allocation.

5. A method of transport stream multiplexing comprising connecting a plurality of elements in a ring, in each element:
   encoding a program source to provide a local transport stream that includes a first bandwidth request indicating a desired bandwidth for encoding the program source;
   multiplexing the local transport stream with an input transport stream to provide an output transport stream, the input transport stream including second bandwidth requests;
   determining from the first and second bandwidth requests a bandwidth allocation indicating an actual bandwidth to use for encoding the program source; including the first and second bandwidth requests in the output transport stream; and
   coupling each output stream to provide the input transport stream of the succeeding element in the ring.

6. The method of claim 5 wherein each output stream includes the bandwidth allocation.

* * * * *